United States Patent Office 3,309,428
Patented Mar. 14, 1967

---

3,309,428
OIL-SOLUBLE BIS(METHYLPHOSPHONO-DISULFIDES
George M. Calhoun, Cleveland, Ohio, and Hyman Diamond, Sacramento, Calif., assignors to Shell Oil Company, New York, N.Y., a corporation of Delaware
No Drawing. Original application Dec. 23, 1960, Ser. No. 77,817, now Patent No. 3,238,131, dated Mar. 1, 1966. Divided and this application July 16, 1965, Ser. No. 472,663
5 Claims. (Cl. 260—932)

This patent application is a division of copending patent application Ser. No. 77,817 filed Dec. 23, 1960, now Patent No. 3,238,131.

This invention relates to a new and novel class of oil-soluble acidic bis(phosphonomethyl)disulfides for use in fuels and lubricants. The compounds of the present invention can be represented by the general formulas:

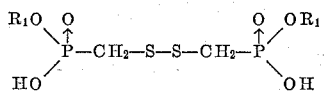

and

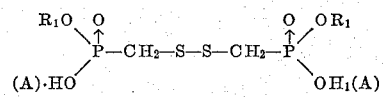

where $R_1$ is hydrogen and A is a $C_{1-8}$ alkyl radical or a $C_{8-30}$ alkylamine, e.g., octylamine, laurylamine, stearylamine, etc., or branched-chain primary aliphatic amines, e.g., t-$C_{8-24}$ alkylamine, such as t-$C_8H_{17}NH_2$, $C_{12}H_{25}NH_2$ to t-$C_{15}H_{31}NH_2$, or t-$C_{18}H_{37}NH_2$ to t-$C_{22}H_{45}LNH_2$, or $C_{5-18}$ secondary aliphatic amines, such as diamylamine, di-2-ethylhexylamine, didecylamine, etc.

The acidic bis(phosphonomethyl)disulfides are prepared by reacting an alkali disulfide, e.g., sodium or potassium disulfide, with a halomethyl phosphono compound such as monohydrocarbyl ester of chloromethylphosphonic acid in a suitable solvent such as an aqueous alcoholic solution, at reflux temperature and under inert conditions until the reaction is completed which normally requires from 1 to about 5 days. Suitable halomethylphosphonic compounds include monoalkyl chloromethylphosphonates, e.g., monobutyl chloromethylphosphonate, mono-2-ethylhexylchloromethylphosphonate, monolauryl chloromethylphosphonate, monobenzyl chloromethylphosphonate, and the like.

A preferred method of making the disulfides of this invention is to react sodium or potassium disulfide with a partial ester of chloromethylphosphonic acid in an alcoholic solution under reflux conditions and under an inert atmosphere for about 24 hours and thereafter neutralizing to a pH of about 7 and ether extract and water washing the acidic bis(phosphonomethyl)disulfide. The product can be used as such or treated with a strong acid such as hydrochloric acid to spring the free acid which can be converted into desired partial esters or amine salts for use as oil, fuel and grease additives as well as other uses.

The following examples illustrate the preparation of additives for use in accordance with the present invention.

EXAMPLE I

Stoichiometric amounts of sodium disulfide and monobutyl monochloromethylphosphonate were refluxed for about 24 hours in an alcoholic solution (ethanol) under nitrogen atmosphere and thereafter the pH of the mixture was adjusted to around 7 and the bis(monobutyl phosphonomethyl)disulfide was ether extracted and water washed to give a 60–65% yield of bis(monobutyl phosphonomethyl)disulfide.

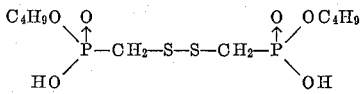

EXAMPLE II

Di-2-ethylhexylamine salt of bis(monobutylphosphonomethyl)disulfide was prepared by reacting the product of Example I with di-2-ethylhexylamine in an amount sufficient to neutralize completely both acid (—OH) groups, at about 50° C. in an alcoholic solution and thereafter recovering the amine salt from the alcoholic solution.

EXAMPLE III

Following the procedure of Example II, the tert-octadecylamine salt of the product of Example I was prepared using tert-octadecylamine, available commercially under the trade name of Primene JM-T, instead of di-2-ethylhexylamine.

The following additional acidic bis(phosphonomethyl) disulfides illustrate the additive of the present invention: bis(monoamyl phosphonomethyl)disulfide, bis(monooctyl phosphonomethyl)disulfide, bis(monobenzyl phosphonomethyl)disulfide, dioctylamine salt of bis(monobutyl phosphonomethyl)disulfide,

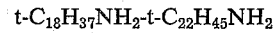

salt of bis(monobutyl phosphonomethyl)disulfide.

Additional improvement of oil and fuel compositions containing the additives of the present invention is accomplished by addition of small amounts of alkylated bisphenols.

The alkylated bisphenols may contain from 1 to 8 alkyl groups, but preferably they contain from 2 to 6 alkyl groups; alkylated bisphenols having 4 alkyl groups are particularly preferred. Each of the alkyl groups may contain from 1 to 10 carbon atoms, preferably 2 to 6 carbon atoms, and especially 4 carbon atoms. Furthermore, the alkyl groups in any particular bisphenol may be the same or different and may also be primary, secondary or tertiary alkyl groups. Bisphenols containing at least one tertiary alkyl group are particularly preferred.

As examples of the alkylated bisphenols which may be used according to the invention, there are mentioned bis(3-ethyl-4-hydroxyphenyl)disulfide,
bis(3-methyl-4-propyl-5-hydroxyphenyl)disulfide,
bis(2-isopropyl-3-butyl-5-hydroxyphenyl)selenide,
2,2'-diethyl-3-tertiary-butyl-4,4'-dihydroxydiphenyl
  selenide,
bis 1,2(2,6-ditertiary-butyl-4-hydroxyphenyl)thiaethane,
bis 1,2(2,5-diisopropyl-3-hydroxyphenyl)thiaethane,
bis(3,5-ditertiary-butyl-4-hydroxyphenyl)sulfide,
2,4-diisobutyl-3-hydroxybenzyl-2',4'-dipropyl-3'-
  hydroxybenzyl sulfide,
bis 1,2(3-octyl-5-tertiary-butyl-4-hydroxyphenyl)ethane,
bis 1,1(2,6-diisopropyl-4-hydroxyphenyl)ethane,
1,2-bis(2,4-ditertiary pentyl-3-hydroxyphenyl)propane,
bis 2,2(4,5-ditertiary-butyl-2-hydroxyphenyl)propane,
bis(2-tertiary-butyl-5-isopentyl-4-hydroxyphenyl)amine,
bis(3,5-dibutyl-5-hydroxyphenyl)ether,
bis(2,6-dipropyl-4-hydroxyphenyl)ether.

Preferred compounds are the alkylated bisphenols having a sulfur or methylene bridge, the former including bis(2,5-dipentyl-4-hydroxyphenyl)sulfide,
bis(2,5-dihexyl-3-hydroxyphenyl)sulfide,
bis(2-methyl-5-tertiary-butyl-4-hydroxyphenyl)sulfide,
bis(2-methyl-5-tertiary-butyl-6-hydroxyphenyl)sulfide and, particularly,
bis(3-tertiary-butyl-5-methyl-2-hydroxyphenyl)sulfide, and examples of the latter, namely, alkylated bisphenols having a methylene bridge, include bis(2,3-ditertiary-butyl-4-hydroxyphenyl)methane,
bis(2,5-ditertiary-butyl-4-hydroxyphenyl)methane,
bis(2,6-ditertiary-butyl-4-hydroxyphenyl)methane,
bis(3,5-ditertiary octyl-4-hydroxyphenyl)methane,
bis(3-tertiary-butyl-5-tertiary-octyl-4-hydroxyphenyl) methane, and especially,
bis(3,5-ditertiary-butyl-4-hydroxyphenyl)methane.

Also, the phosphonomethyl disulfide additive, alone or in combination with a bisphenol, appears to co-act with certain phosphorus compounds to give additional unexpected improvement in anti-wear and anti-scuffing. Thus, this desirable improvement can be imparted to lubricants of this invention by also incorporating a small amount (0.01–2% preferably 0.1–1%) of a partial or full ester of an organic phosphorus compound. Phosphorus compounds of this type include alkyl, cycloalkyl, alkaryl, aralkyl, and aryl phosphites, phosphates, phosphonates, and their thio derivatives, such as $C_{3-18}$ alkyl phosphites, e.g., di- and tri-butyl, octyl, lauryl, stearyl, cyclohexyl, benzyl, cresyl, phenyl phosphite or phosphates, as well as their thio derivatives; $P_2S_5$-pine oil reaction product, and metal salts thereof such as Na, K, Ca or Ba salts of $P_2S_5$-terpene reaction product; dibutyl methylphosphonate, dibutyl trichloromethylphosphonate, dibutyl monochloromethylphosphonate, dibutyl chlorophenylphosphonate, and the like. The esters of pentavalent phosphorus acids such as diphenyl, dicresyl, triphenyl, tricresyl, trilauryl and tristearyl orthophosphates, $P_2S_5$-terpene reaction products and mixtures thereof are preferred.

Minor amounts of each class of additives are sufficient for a highly effective combination. The bis(phosphonomethyl)disulfide may be used in an amount of about 0.1–10%, preferably about 0.2–5% by weight, while about 0.05–2%, preferably about 0.1–1% of the methylene bisphenol or sulfide derivative thereof is highly useful and about 0.1%–2% of an organic phosphorus compound as described in the preceding paragraph.

The additives of the present invention may be used to improve various hydrocarbon lubricating oils, whether of natural origin or synthetic, especially oils which are substantially paraffinic and/or naphthenic; these may contain substantial proportions of hydrocarbons having aromatic character, but the amounts and types of components should be such that the Dean and Davis (Chem. and Met. Eng., vol. 36, 1929, pp. 618–619) viscosity index of the base oil is at least 80, preferably 90 to 150.

The oil may be derived from a highly paraffinic crude, in which case distillation and/or dewaxing may be sufficient to provide a suitable base stock; a minimum of chemical or selective solvent treatment may be used if desired. Mixed-base crudes and even highly aromatic crudes which contain paraffinic hydrocarbons also provide suitable base stocks by well known refining techniques. Usually, these comprise the separation of distillate fractions of suitable boiling range followed by selective solvent extraction with solvents such as furfural, phenol, and the like to provide raffinate fractions which are suitable for further refining by dewaxing or chemical treatment such as sulfuric acid treatment, etc. Thus, it may be a refined hydrocarbon oil obtained from a paraffinic, naphthenic, asphaltic or mixed-base crude, and/or mixtures thereof, such as SAE 5W, 10W, 20W, 20, 30, 40, 50 mineral oils. The hydrocarbon oils may be blends of different mineral oil distillates and bright stock; they may have blended therewith, in minor but compatible proportions, fixed oils, such as castor oil, lard oil and the like and/or with synthetic lubricants, such as polymerized olefins, e.g., polyisobutylene.

The following compositions are representative of the invention:

Composition A

| | Percent |
|---|---|
| Example I additive | 2 |
| 1010 Mineral oil | Balance |

Composition B

| | |
|---|---|
| Example II additive | 2 |
| 1010 Mineral oil | Balance |

Composition C

| | |
|---|---|
| Example III additive | 2 |
| 1010 Mineral oil | Balance |

Composition D

| | |
|---|---|
| Example I additive | 2 |
| Bis(3,5-ditert-butyl-4-hydroxyphenyl)methane | 0.75 |
| 1010 Mineral oil | Balance |

Composition E

| | |
|---|---|
| Example II additive | 1 |
| SAE 30 Mineral oil | Balance |

Composition F

| | |
|---|---|
| Example I additive | 2 |
| SAE 90 Mineral oil | Balance |

Composition G

| | |
|---|---|
| Example I additive | 2 |
| Bis(3,5-ditert-butyl-4-hydroxyphenyl)methane | 0.5 |
| SAE 90 Mineral oil | Balance |

Composition H

| | |
|---|---|
| Example I additive | 5 |
| Ucon 50HB660 (polyethylene-propylene glycol having a SUS viscosity at 100° F. of 660) | Balance |

Composition I

| | |
|---|---|
| Example I additive | 2 |
| Di-2-ethylhexyl sebacate | Balance |

Composition J

| | |
|---|---|
| Example I additive | 1 |
| Leaded gasoline (3 cc. of TEL) | Balance |

Composition K

| | |
|---|---|
| Example I additive | 0.1 |
| Fuel oil (No. 2) | Balance |

Compositions of this invention were evaluated for their extreme pressure properties on a Spur-Gear machine. The machine consists essentially of two geometrically similar parts of gears connected by two parallel shafts. The gear pairs are placed in separate gear boxes which also contain the supporting ball bearings. One of the shafts consists of two sections connected by a coupling. Loading is accomplished by locking one side of the coupling and applying torque to the other. The conditions of the test were:

Speed, 3200 r.p.m.
Oil temperature, 100° C.
Oil flow-rate, 10 cc./sec.
Load in increments; 5 min. at each setting Results of the evaluations are given in Table I and, for the purpose of comparison, the results obtained from the use of the base oil alone and with other known extreme pressure compositions are also given.

Table I

| Composition: | Score load, lbs./in. |
|---|---|
| A through I | 6,400 |
| 1010 mineral oil +2% $C_{16}$ alkenyl succinic acid | 1,400 |
| 1010 mineral oil +2% malonic acid | 2,800 |
| 1010 mineral oil +2% 3-hexadecyl adipic acid | 1,400 |

Table I—Continued

| Composition: | Score load, lbs./in. |
|---|---|
| 1010 mineral oil +2% dodecylmercaptosuccinic acid | 1,400 |
| 1010 mineral oil +10% glycerol monooleate | 1,800 |
| 1010 mineral oil +2% $C_{13}H_{27}OH$ ("OXO" process) | 600 |

Other representative compositions of this invention which are similarly effective are:

(1) Mineral oil +0.15% bis(3,5-ditert-butyl-4-hydroxyphenyl)methane +0.15 Example I additive.
(2) Gasoline +0.05% bis(3-isopropyl-5-tert-butyl-4-hydroxyphenyl)methane +0.05% Example II additive.
(3) Di-2-ethylhexyl sebacate +0.15% bis(3-methyl-5-tert-butyl-4-hydroxyphenyl)methane +0.15% Example III additive.

Compositions of this invention are particularly applicable for high-temperature, high-speed use as in aviation engines, automotive engines and truck engines, as well as industrial equipment operating under the conditions described in this invention.

We claim as our invention:

1. An oil-soluble bis(mono-$C_{1-8}$ alkyl phosphonomethyl)disulfide.
2. An oil-soluble bis(monobutyl phosphonomethyl)disulfide.
3. An oil-soluble amine salt of bis(mono-$C_{1-8}$ alkyl phosphonomethyl)disulfide.
4. An oil-soluble amine salt of bis(monobutyl phosphonomethyl)disulfide.
5. An oil-soluble t-octadecylamine salt of bis(monobutyl phosphonomethyl)disulfide.

References Cited by the Examiner
UNITED STATES PATENTS 2,857,304   10/1958   Birum _____ 167—22

CHARLES B. PARKER, *Primary Examiner.*

B. BILLIAN, *Assistant Examiner.*